US012699674B1

(12) United States Patent
Cichy et al.

(10) Patent No.: US 12,699,674 B1
(45) Date of Patent: Aug. 4, 2026

(54) TECHNOLOGIES FOR ENABLING RULE ENGINES TO OPERATE BASED ON DATA CHUNKING

(71) Applicant: Monarch Specialty Group, Inc., Chicago, IL (US)

(72) Inventors: Stephen Barrett Cichy, Chicago, IL (US); Markus Daniel Bockle, Chicago, IL (US)

(73) Assignee: Monarch Specialty Group, Inc., Chicago, IL (US)

( * ) Notice: Subject to any disclaimer, the term of this patent is extended or adjusted under 35 U.S.C. 154(b) by 0 days.

(21) Appl. No.: 19/327,921

(22) Filed: Sep. 12, 2025

(51) Int. Cl.
| | |
|---|---|
| *G06F 16/00* | (2019.01) |
| *G06F 16/2455* | (2019.01) |
| *G06F 16/2458* | (2019.01) |
| *G06F 16/25* | (2019.01) |
| *G06F 16/27* | (2019.01) |

(52) U.S. Cl.
CPC ........ *G06F 16/00* (2019.01); *G06F 16/24564* (2019.01); *G06F 16/2471* (2019.01); *G06F 16/25* (2019.01); *G06F 16/258* (2019.01); *G06F 16/27* (2019.01)

(58) Field of Classification Search
CPC .. G06F 16/00; G06F 16/2464; G06F 16/2471; G06F 16/25; G06F 16/258; G06F 16/27
See application file for complete search history.

(56) References Cited

U.S. PATENT DOCUMENTS

| | | |
|---|---|---|
| 11,238,539 B1 | 2/2022 | Harding et al. |
| 11,520,583 B2 | 12/2022 | John et al. |
| 11,676,692 B1 * | 6/2023 | Arends ................... G06F 9/542 |
| | | 705/3 |
| 11,698,914 B1 * | 7/2023 | Duvedi ................... G06F 16/28 |
| | | 707/803 |
| 11,727,503 B2 | 8/2023 | Coutinho et al. |

(Continued)

FOREIGN PATENT DOCUMENTS

| | | |
|---|---|---|
| CN | 118551046 | 8/2024 |
| IN | 202411098061 | 1/2025 |

OTHER PUBLICATIONS

Kesavan et al., "Firestore: The NoSQL Serverless Database for the Application Developer" Jul. 26, 2023, IEEE, pp. 3376-3388. (Year: 2023).*

(Continued)

*Primary Examiner* — Miranda M Huang
*Assistant Examiner* — Chase P. Hinckley
(74) *Attorney, Agent, or Firm* — Dentons US LLP

(57) ABSTRACT

This disclosure enables a cloud-based system that processes data requests in real-time using a serverless architecture. The system receives structured requests from a computing terminal, transforms those requests, and responsively runs statistical models to generate decision outputs. These outputs are stored as metadata for historical trend analysis and are also evaluated by a rule engine to produce a result. The system operates without pre-provisioned servers, using distributed compute nodes that scale automatically and complete processing within a time window. By combining parallel execution, dynamic configuration, and historical context, the system delivers fast, intelligent decisions with minimal infrastructure overhead.

23 Claims, 4 Drawing Sheets

(56)     References Cited

U.S. PATENT DOCUMENTS

| | | | |
|---|---|---|---|
| 12,210,532 | B2 | 1/2025 | Colcord et al. |
| 12,314,265 | B1 * | 5/2025 | Liu ........................ G06F 16/248 |
| 12,417,214 | B1 * | 9/2025 | Zhang ................... G06F 40/205 |
| 12,517,864 | B2 * | 1/2026 | Schwerin .............. G06F 16/119 |
| 12,541,522 | B1 * | 2/2026 | Gracia-Tinedo ............................ G06F 16/24568 |
| 2021/0334282 | A1 * | 10/2021 | Srinivasan ........ G06F 16/24542 |
| 2021/0342197 | A1 * | 11/2021 | Srinivasan .............. G06F 9/505 |
| 2023/0409967 | A1 * | 12/2023 | Chahal .................. G06F 9/5066 |
| 2024/0045598 | A1 * | 2/2024 | Derryberry ........... G06F 3/0619 |
| 2025/0103555 | A1 | 3/2025 | Omar et al. |
| 2025/0117385 | A1 * | 4/2025 | Ayyappan ........... G06F 16/2264 |
| 2025/0119467 | A1 * | 4/2025 | Gracia-Tinedo ...... G06F 3/0629 |
| 2025/0190460 | A1 * | 6/2025 | Madisetti .......... G06F 16/24539 |
| 2025/0225402 | A1 * | 7/2025 | Gross ........................ G06N 3/09 |
| 2025/0239346 | A1 * | 7/2025 | Baumohl ............... G06Q 10/10 |
| 2025/0307286 | A1 * | 10/2025 | Hurst ................... G06F 16/3338 |
| 2025/0322087 | A1 * | 10/2025 | Salarian .............. G06F 21/6209 |
| 2025/0329452 | A1 * | 10/2025 | Lens-ter Berg ........ G16H 80/00 |

OTHER PUBLICATIONS

Lu et al., "Bridging the Gap: Enabling Natural Language Queries for NoSQL Databases through Text-to-NoSQL Translation" Feb. 18, 2025, arXiv: 2502.11201v1, pp. 1-16. (Year: 2025).*

Wei et al., "An Extensive Study on Text Serialization Formats and Methods" May 10, 2025, arXiv: 2505.13478v1, pp. 1-19. (Year: 2025).*

Zhao et al., "MOC: Mixtures of Text Chunking Learners for Retrieval-Augmented Generation System" May 26, 2025, arXiv: 2503.09600v2, pp. 1-18. (Year: 2025).*

Kang et al., "Abase: the Multi-Tenant NoSQL Serverless Database for Diverse and Dynamic Workloads in Large-scale Cloud Environments" May 12, 2025, arXiv: 2505.07692v1, pp. 1-14. (Year: 2025).*

Upreti et al., "Cost-Effective, Low Latency Vector Search with Azure Cosmos DB" Jul. 31, 2025, arXiv: 2505.05885v2, pp. 1-18. (Year: 2025).*

Guerraoui et al., "Efficient Federated Search for Retrieval-Augmented Generation" Apr. 2025, pp. 74-81. (Year: 2025).*

Hwang et al., "Dynamic Chunking for End-to-End Hierarchical Sequence Modeling" Jul. 15, 2025, arXiv: 2507.07955v2, pp. 1-39. (Year: 2025).*

Pesl et al., "Advanced System Integration: Analyzing OpenAPI Chunking for Retrieval-Augmented Generation" Jul. 28, 2025, arXiv: 2411.19804v2, pp. 1-16. (Year: 2025).*

Qin et al., "MultiTEND: A Multilingual Benchmark for Natural Language to NoSQL Query Translation" Feb. 16, 2025, arXiv: 2502.11022v1, pp. 1-27. (Year: 2025).*

Choi et al., "MALADE: Orchestration of LLM-powered Agents with Retrieval Augmented Generation for Pharmacovigilance" Aug. 3, 2024, arXiv: 2408.01869v1, pp. 1-49. (Year: 2024).*

Liu et al., "PharmacyGPT: the Artificial Intelligence Pharmacist and an Exploration of AI for ICU Pharmacotherapy Management" Oct. 3, 2024, arXiv: 2307.10432v3, pp. 1-21. (Year: 2024).*

* cited by examiner

NCPDP Message

022816D001
\x1c\xf3\x32\x36\x1c\xc0\x04//\x28\x31\x29\x1c\xa4\x01\x1e\x1c\xa4\x04\x1e\x1c\x28\x06\x1c\xcc\x38\x1e\x3c\xc6\x1e\x3c\xc6\x1e\x3c\xc8\x38\x1e\x3c\xc8\x08\x1e\x3c\xc2\x3e\x1e\x3c\x61\x1e
\x1c\xa0\x07\x1c\xce\x01\x1c\xd2\x12\x34\x35\x37\x89\x1c\xf6\x03\x1c\x07\x30\x86\x80\x07\x85\x1e\x3c\x78\x00\x00\x1c\xd3\x38\x1e\x3c\x63\x1e\x3c\x30\x1e\x3c\x3e\x1e\x3c\x08\x01\x1e\x3c\xe0\x20\x24\x06\x20\x1e\x3c\x0f\x21\x3c\x03\x1e\x3c\x03\x1e\x3c\x08\x01\x1e\x3c\x28\x06\x1e\x3c\x03\x1e\x3c\x07\x01\x1e
\x1c\xa0\x01\x1c\xce\x20\x1e\x3c\x08\x00\x00\x00\x00\x01\x3c\x00\x00\x0f\x1c\x29\x08\x01\x1e\x3c\xcf\x00\x84\x56\x44\x34\x35\x1c\xc3\x7d\x00\x1e\x3c\x2c\x12\x1e\x1c\x32\x12 WEST KINZIE ST \x1e\x3c\x23\x4b\xc1\xc0\x60\x1e\x3c\x30\x1e\x3c\x2f\x00\x65\x1e
\x1c\xa0\x05\x1c\xca\x01\x1c\xa5\x00\x1e\x1c\x06\x05\x1e\x3c\x27\x01\x2e\x35\x1e\x3c\x08\x20\x24\x06\x24\x1e\x3c\xe0\x30\x1e\x3c\x08\x02\x46\x75\x1e\x1e\x3c\x6a\x01\x1e\x1c\x40\x41\x1e\x3c\x09\x24\x34\x80\x1e\x3c\xd0\x00\x1e\x3c\x00\x24\x80\x0e\x1e\x3c\x00\x00\x1e JSON Message {"transaction_header": {"bin_number": "022816", "version_number": "D0", "transaction_code": "B1", "pcn": "        ", "transaction_count": 1, "service_provider_id_qualifier": "01", "service_provider_id": "9999999999", "date_of_service": "2024-06-24", "software_id": ""}, "patient": {"segment_identification": "01", "date_of_birth": "1961-09-09", "patient_gender_code": 2, "patient_first_name": "BOB", "patient_last_name": "SMITH", "place_of_service": 1, "patient_street_address": "300 ROAD ST", "patient_city": "JACKSONVILLE", "patient_state": "FL", "patient_zip": "32226", "patient_phone_number": "9893234389", "patient_residence": "01"}, "insurance": {"segment_identification": "04", "cardholder_id": "000", "person_code": "01", "patient_relationship_code": "1", "cardholder_first_name": "BOB", "cardholder_last_name": "SMITH"}, "transactions": [{"claim": {"segment_identification": "07", "prescription_reference_number_qualifier": "1", "prescription_reference_number": "123456789", "product_id_qualifier": "03", "product_id": "50001000785", "quantity_dispensed": 60.0, "fill_number": 0, "days_supply": 30, "compound_code": 1, "dispense_as_written": "0", "date_prescription_written": "2024-06-20", "number_of_refills_authorized": 2, "prescription_origin_code": "3", "special_packaging_indicator": "1", "unit_of_measure": "GM", "other_coverage_code": "03"}, "pharmacy_service_type": "01"}, "prescriber": {"segment_identification": "03", "prescriber_id_qualifier": "01", "prescriber_id": "9999999999", "prescriber_last_name": "DOE", "prescriber_first_name": "JOHN", "prescriber_street_address": "212 WEST KINZIE ST", "prescriber_city": "CHICAGO", "prescriber_telephone_number": "9845644345", "prescriber_state": "FL", "prescriber_zip": "60654"}, "coordination_of_benefits": {"segment_identification": "05", "other_payers": [{"coverage_type": "01", "id_qualifier": "03", "id": "012803", "date": "2024-06-24", "reject_count": 1, "reject_codes": ["75"]}]}, "pricing": {"segment_identification": "11", "ingredient_cost_submitted": 2454.0, "dispensing_fee_submitted": 0.0, "patient_paid_amount_submitted": 0.0, "usual_and_customary_charge": 2454.0, "gross_amount_due": 2454.0, "basis_of_cost_determination": "01"}}]}

TECHNOLOGIES FOR ENABLING RULE ENGINES TO OPERATE BASED ON DATA CHUNKING

TECHNICAL FIELD

This disclosure relates to enabling rule engines to operate based on data chunking.

BACKGROUND

Conventionally, a rule engine may be programmed to apply a business rule to an input (e.g., a message) received from a data source (e.g., an application program). This modality of computing promotes agility and adaptability for processes driven by dynamic rules and regulations, by decoupling a business logic from an application logic, thereby allowing a business user to modify the business logic, by modifying the business rule, without changing the application logic, especially when the data source is subject to change. Resultantly, the rule engine may be forward-chaining (e.g., processing condition-action rules) or reactive (e.g., detecting and reacting to events and patterns) to enable a data transaction to occur.

Despite the rule engine having such technological benefits, the rule engine may still suffer from various technological drawbacks. Some of these drawbacks may cause the rule engine to be limited in (i) expressing complex logic to enable the data transaction to occur, (ii) handling time/event synchronization to enable the data transaction to occur, (iii) providing insights into rule execution to enable the data transaction to occur, or (iv) modeling uncertainties to enable the data transaction to occur.

Another drawback arises when the rule engine is deployed in distributed or serverless environments where compute resources are not provisioned in real-time. In such environments, the rule engine may be unable to efficiently coordinate with upstream and downstream components, such as relevant parsing logic and execution logic, due to an absence of a persistent compute state. This lack of coordination may hinder the rule engine's ability to process requests within strict time constraints, especially when the requests contain multiple attributes requiring dynamic configuration and model selection. Consequently, the rule engine may fail to timely deliver binary results, thereby impeding completion of the data transaction.

Additionally, the rule engine may lack access to historical metadata that could contextualize a current request in relation to prior requests. Without such contextualization, the rule engine may be unable to apply rules that depend on historical trends or behavioral patterns, such as detecting anomalies or enforcing temporal constraints. This limitation may be exacerbated when the historical metadata is stored in a separate data system or format that is not readily accessible to the rule engine during execution. Resultantly, the rule engine may apply rules in a vacuum, without leveraging insights from past data transactions, thereby reducing accuracy and relevance of the binary results.

Furthermore, the rule engine may be constrained by format and structure of data that the rule engine receives from the execution logic. When the execution logic outputs data in a format that is not natively compatible with the rule engine, additional transformation steps may be required, introducing latency and increasing the risk of data loss or misinterpretation. These transformation steps may also complicate traceability of rule execution, thereby complicating audits or debugging as to how a particular binary result was derived. Such traceability is often critical in regulated environments, where decisions must be justified based on both current inputs and historical context.

SUMMARY

This disclosure enables a cloud-based system that processes data requests in real-time using a serverless architecture. The system receives structured requests from a computing terminal, transforms those requests, and responsively runs statistical models to generate decision outputs. These outputs are stored as metadata for historical trend analysis and are also evaluated by a rule engine to produce a result (e.g., binary, non-binary). The system operates without pre-provisioned servers, using distributed compute nodes that scale automatically and complete processing within a time window. By combining parallel execution, dynamic configuration, and historical context, the system delivers fast, intelligent decisions with minimal infrastructure overhead.

DESCRIPTION OF DRAWINGS

FIG. 4 shows a diagram of an example of a content formatted in a first data format and a second data format according to this disclosure.

DETAILED DESCRIPTION

Figure 1:
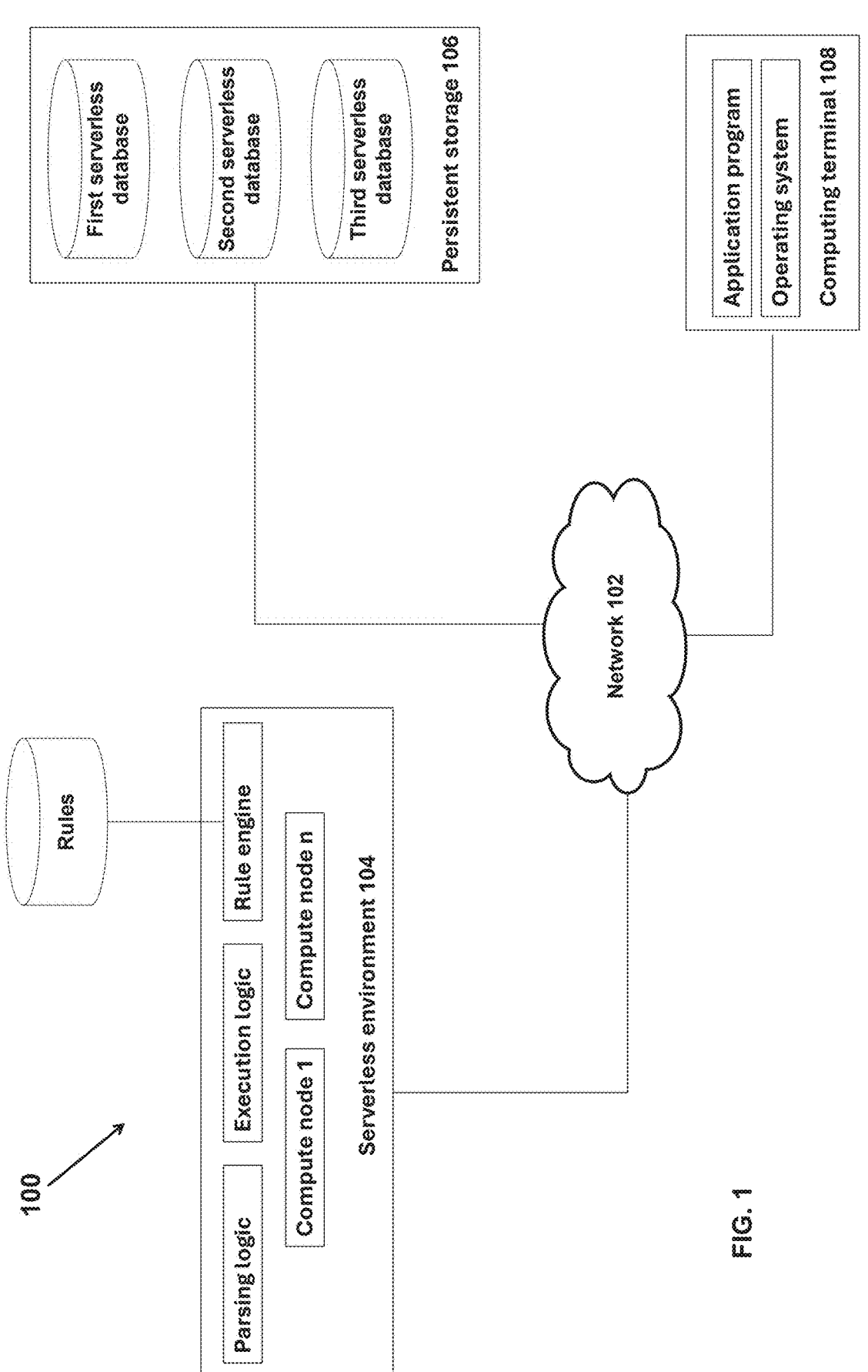
FIG. 1 shows a diagram of an example of a computing architecture according to this disclosure.

As explained above, this disclosure enables a cloud-based system that processes data requests in real-time using a serverless architecture. The system receives structured requests from a computing terminal, transforms those requests, and responsively runs statistical models to generate decision outputs. These outputs are stored as metadata for historical trend analysis and are also evaluated by a rule engine to produce a result (e.g., binary, non-binary). The system operates without pre-provisioned servers, using distributed compute nodes that scale automatically and complete processing within a time window. By combining parallel execution, dynamic configuration, and historical context, the system delivers fast, intelligent decisions with minimal infrastructure overhead.

The system may be exemplified as a technology that addresses latency and storage inefficiencies in distributed, serverless environments, especially when rule engines are involved. The technology enables data chunk-by-data chunk writing to reduce memory contention and supports consistent metadata updates, especially when rule engines are involved. The technology enables parallel execution of executable files to increase throughput without requiring real-time provisioning of compute nodes, especially when rule engines are involved. The technology enables use of configuration profiles and statistical models to allow for targeted processing that reduces latency in distributed environments, while also enabling rule engines programmed for (i) expressing complex logic to enable data transactions to occur, (ii) handling time/event synchronization to enable data transactions to occur, (iii) providing insights into rule execution to enable data transactions to occur, and (iv) modeling uncertainties to enable data transactions to occur.

This disclosure is now described more fully with reference to various figures that are referenced above, in which some examples of this disclosure are shown. This disclosure may, however, be embodied in many different forms and should not be construed as necessarily being limited to only examples disclosed herein. Rather, these examples are provided so that this disclosure is thorough and complete, and fully conveys various concepts of this disclosure to skilled persons.

Various terminology used herein can imply direct or indirect, full or partial, temporary or permanent, action or inaction, individual or collective. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of natural inclusive permutations. That is, if X employs A; X employs B; or X employs both A and B, then "X employs A or B" is satisfied under any of foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes," "contains," "has," or "comprising," "including," "containing," or "having" (or any tenses thereof) when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

As used herein, a term "about" or "substantially" refers to a +/−10% variation from a nominal value/term. Such variation is always included in any given value/term provided herein, whether or not such variation is specifically referred thereto.

As used herein, a term "or others," "combination", "combinatory," or "combinations thereof" refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled persons understand that typically there is no limit on a number of items or terms in any combination, unless otherwise contextually apparent.

Features or functionality described with respect to certain examples may be combined or sub-combined in or with various examples in any permutational or combinatorial manner. Different aspects or elements of examples, as disclosed herein, may be combined or sub-combined in a similar manner. A skilled person will understand that typically there is no limit on a number of items or terms in any combination, unless otherwise contextually apparent Some examples, whether individually or collectively, can be components of a larger system, where other procedures can take precedence over or otherwise modify their application. Additionally, a number of steps can be required before, after, or concurrently with examples, as disclosed herein. Note that any or all methods or processes, at least as disclosed herein, can be at least partially performed via at least one entity in any manner.

Some examples are described herein with reference to illustrations of idealized examples (and intermediate structures) of this disclosure. As such, variations from various illustrated shapes as a result, for example, of manufacturing techniques or tolerances, are to be expected. Thus, various examples should not be construed as necessarily limited to various particular shapes of regions illustrated herein, but are to include deviations in shapes that result, for example, from manufacturing.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

FIG. 1 shows a diagram of an example of a computing architecture according to this disclosure. In particular, there is a system 100 containing a network 102 (e.g., a LAN, a WAN, a cellular network, a satellite network), a serverless environment 104, a persistent storage 106, and a computing terminal 108 (e.g., a desktop computer, a laptop computer, a wearable computer, a phone). The serverless environment 104 hosts a plurality of compute nodes, a parsing logic (e.g., a parser), an execution logic (e.g., an application program), and a rule engine. The plurality of compute nodes distributively run the parsing logic, the execution logic, and the rule engine. The persistent storage 106 hosts a first serverless database, a second serverless database, and a third serverless database. The computing terminal 108 hosts an operating system and an application program (e.g., a task dedicated application, a browser) hosted on the operating system. The rule engine accesses a plurality of rules external to the rule engine, although the rule engine may host the plurality of rules internal to the rule engine. The serverless environment 104 is connected to the network 102. The persistent storage 106 is connected to the network 102. The computing terminal 108 is connected to the network 102.

The network 102 is exemplified as a communication infrastructure that enables data exchange between the serverless environment 104, the persistent storage 106, and the computing terminal 108. The network 102 may be implemented using one or more physical or virtualized communication layers, which may include Ethernet, Wi-Fi, cellular, or satellite communication links. The network 102 may support standard communication protocols, such as TCP/IP, HTTP, HTTPS, or gRPC. The network 102 may be configured to route requests from the computing terminal 108 to the serverless environment 104 and to facilitate data access between the serverless environment 104 and the persistent storage 106. The network 102 may include routing logic, switching logic, and load balancing logic to manage traffic across distributed components. The network 102 may also support secure communication channels using encryption protocols such as TLS. In some examples, the network 102 may be implemented as a virtual private cloud (VPC) or a hybrid network spanning on-premises and cloud infrastructure. The network 102 may be logically segmented to isolate traffic between different services or tenants. The network 102 may be monitored for latency, throughput, and fault tolerance. The network 102 may be idle in the dormant state, with no active data transmission occurring. The network 102 may be configured to support event-driven invocation of services hosted in the serverless environment 104. The network 102 may also support asynchronous messaging or publish-subscribe patterns. The network 102 may be provisioned using infrastructure-as-code tools. The network 102 may be designed to scale elastically with system demand. The network 102 may serve as the backbone for all inter-component communication in system 100.

The serverless environment 104 is exemplified as a distributed computing platform configured to host and execute software logic without requiring persistent server allocation. The serverless environment 104 includes a plurality of compute nodes that are instantiated on demand to execute specific logic components. These compute nodes may be implemented as containers, virtual machines, or isolated runtime environments. The serverless environment 104 is configured to host and execute the parsing logic, the execution logic, and the rule engine. Each of these logic components may be deployed as stateless functions or microservices that are triggered in response to incoming requests. The serverless environment 104 may include orchestration logic to manage the lifecycle of compute nodes, including provisioning, scaling, and termination. The serverless environment 104 may support parallel execution of multiple logic instances across different compute nodes. The serverless environment 104 may be integrated with monitoring, logging, and tracing services to observe the behavior of the hosted logic. The serverless environment 104 may be configured to isolate execution contexts for security and fault containment. The serverless environment 104 may support multiple programming languages and runtime environments. The serverless environment 104 may be idle in the dormant state, with no active compute nodes running. The serverless environment 104 may be connected to the network 102 to receive requests and access data. The serverless environment 104 may be deployed in a public cloud, private cloud, or hybrid infrastructure. The serverless environment 104 may be configured to enforce execution time limits and resource quotas. The serverless environment 104 may be designed to support high availability and fault tolerance. The serverless environment 104 may be hosted by a single physical server or distributed among a plurality of physical servers located in a single data center (e.g., a building) or distributed among a plurality of data centers (e.g., buildings).

The parsing logic is exemplified as a software component (e.g., a parser, an API, a web application, a dedicated application program, a software engine, a software module) hosted in the serverless environment 104 and configured to receive, interpret, and transform incoming requests. The parsing logic may be implemented as a stateless function that is triggered when a request is received from the computing terminal 108. The parsing logic is configured to receive the request in a first data format, such as a National Council for Prescription Drug Programs (NCPDP) format. The parsing logic may validate the structure of the request and extract a plurality of attributes from the request payload. The parsing logic may convert the request into a second data format, such as a structured or delimited format, that is compatible with downstream processing. The parsing logic may normalize field names, enforce data types, and apply schema validation rules. The parsing logic may also enrich the request with metadata or contextual information. The parsing logic may be deployed across multiple compute nodes to enable concurrent processing of multiple requests. The parsing logic may be configured to log parsing outcomes and errors for traceability. The parsing logic may be versioned to support backward compatibility with legacy request formats. The parsing logic may be integrated with authentication and authorization services to validate request origin. The parsing logic may be idle in the dormant state, awaiting invocation. The parsing logic may be monitored for throughput, latency, and error rates. The parsing logic may be designed to support extensible parsing rules or plug-in modules. The parsing logic may serve as the entry point for request processing in system 100.

Each request may be generated by the application program containing a plurality of attributes, such as patient ID, medication code, dosage, and insurance information in pharmacy-based scenarios. The parsing logic may extract and process these attributes for downstream logic. In another example, healthcare requests may include clinical codes, provider identifiers, and encounter dates. In yet another example, financial requests may include transaction amount, account number, and merchant category. The plurality of attributes enables precise, context-rich processing throughout the system.

The execution logic is exemplified as a software engine (but can be an API, a web application, a dedicated application program, a software module for example) hosted in the serverless environment 104 and configured to orchestrate the selection and execution of statistical models. The software engine may be startable, pausable, or stoppable (as any other software engine disclosed herein). The execution logic receives the request in the second data format from the parsing logic. The execution logic is configured to query the second serverless database to retrieve a subset of configuration profiles based on selected attributes of the request. These configuration profiles may define model selection criteria, execution parameters, or data filtering rules. The execution logic is further configured to query the first serverless database to retrieve a subset of executable files corresponding to the selected configuration profiles. Each executable file may represent a statistical model implemented as a script, binary, or containerized function. The execution logic may execute the retrieved files in parallel to generate a plurality of outputs. Each output may include a binary or non-binary indicator and a context identifier referencing a historical trend. The execution logic may generate a first copy of the outputs in a metadata format for storage and a second copy in the second data format for rule evaluation. The execution logic may be implemented as a stateless and horizontally scalable service. The execution logic may be monitored for execution time, resource usage, and output consistency. The execution logic may be idle in the dormant state, with no active computations. The execution logic may be versioned to support iterative model development. The execution logic may support asynchronous execution and result aggregation. The execution logic may be integrated with observability tools for debugging and performance tuning.

The system 100 may be technologically enabled to utilize a plurality of statistical models, each implemented as an executable file stored in the first serverless database. The execution logic may select and run multiple statistical models in parallel or sequence, allowing for diverse analytical approaches to a given request. For example, in a pharmacy-based scenario, such models may include risk prediction and insurance adjudication. In another use case, healthcare analytics may employ models for patient stratification, outcome prediction, and anomaly detection. In another example, financial systems may use models for fraud detection, credit scoring, and transaction classification. This plurality ensures robust, multi-faceted decision-making.

The first serverless database may store a plurality of executable files, each representing a distinct statistical model or analytical routine. The execution logic may retrieve and run these files in parallel or sequence, enabling diverse analytical workflows. For example, pharmacy systems may use separate files for drug interaction checks, benefit verification, and fraud detection. In another example, clinical analytics may use files for risk scoring and outcome prediction. In yet another example, financial platforms may use files for transaction classification and anomaly detection. This plurality supports scalable, modular analytics.

Upon execution, the system 100 generates a plurality of outputs, each corresponding to the result of a statistical model or analytical routine. These outputs may include binary indicators, context identifiers, and additional metadata. For example, pharmacy-based outputs may include approval status and risk flags. In another example, healthcare analytics may output risk scores and treatment recommendations. In yet another example, financial systems may output transaction classifications and fraud alerts. The plurality of outputs enables comprehensive decision-making.

Each output generated by the execution logic may include a plurality of binary indicators, such as approval/denial flags, compliance checks, or risk presence. For example, pharmacy systems may use binary indicators for insurance approval, drug interaction risk, and regulatory compliance. In another example, clinical analytics may use indicators for event detection and protocol adherence. In yet another example, financial platforms may use indicators for fraud detection and transaction validity. The plurality of binary indicators supports rapid, rule-based decision-making.

The system 100 may generate a plurality of context identifiers within its outputs, each referencing historical trends or specific metadata entries. For example, pharmacy-based context identifiers may link to prior prescription fills or insurance adjudication events. In another example, clinical analytics may use identifiers for previous patient encounters or risk assessments. In yet another example, financial systems may use identifiers for related transactions or audit events. The plurality of context identifiers enables the rule engine to apply context-aware logic.

The system 100 may be designed to process a plurality of requests, each initiated by the application program and handled by the parsing logic, execution logic, and rule engine. For example, pharmacy systems may process multiple prescription requests in parallel. In another example, healthcare analytics may handle batches of patient risk assessments. In yet another example, financial platforms may process streams of transaction requests. The plurality of requests enables high-throughput, scalable operation.

The rule engine is exemplified as a software component hosted in the serverless environment 104 and configured to apply one or more rules to the outputs generated by the execution logic. The rule engine may be implemented using a forward-chaining inference engine, a reactive rule processor, or a hybrid rule evaluation framework. The rule engine may access a plurality of rules stored externally, such as in a centralized rule repository, or internally, such as within a local rule cache. Each rule may be defined using a structured rule language, a decision table, or a condition-action expression. The rule engine is configured to receive the second copy of the outputs in the second data format and apply the relevant rules to determine a binary result, although non-binary result is possible. This binary result may indicate an approval or denial of the request. The rule engine may support rule prioritization, conflict resolution, and conditional branching. The rule engine may also be configured to log rule execution metadata for traceability and compliance. The rule engine may be deployed as a stateless function that scales with request volume. The rule engine may be integrated with policy management systems for rule lifecycle governance. The rule engine may be idle in the dormant state, awaiting invocation. The rule engine may be monitored for rule coverage, evaluation time, and decision accuracy. The rule engine may support dynamic rule loading and hot-swapping. The rule engine may be designed to support explainability and auditability of decisions.

The persistent storage 106 is exemplified as a data storage system configured to host three serverless databases: a first serverless database, a second serverless database, and a third serverless database. The persistent storage 106 may be implemented using cloud-native storage services or distributed NoSQL database platforms. The persistent storage 106 is connected to the network 102 and accessible by the serverless environment 104. The persistent storage 106 may support high availability, durability, and low-latency access. The persistent storage 106 may be logically partitioned to isolate data domains and optimize query performance. The persistent storage 106 may be configured to enforce access control policies and encryption at rest. The persistent storage 106 may be monitored for storage utilization, query latency, and fault tolerance. The persistent storage 106 may be idle in dormant state, with no active read or write operations. The persistent storage 106 may support schema-less data models to accommodate evolving data structures. The persistent storage 106 may be integrated with backup and disaster recovery systems. The persistent storage 106 may be versioned to support data lineage and rollback. The persistent storage 106 may be accessed through APIs or query languages, such as SQL or JSONPath. The persistent storage 106 may be deployed across multiple availability zones for resilience. The persistent storage 106 may be managed using infrastructure-as-code tools. The persistent storage 106 may serve as the central data repository for system 100. The persistent storage 106 may be hosted by a single physical server or distributed among a plurality of physical servers located in a single data center (e.g., a building) or distributed among a plurality of data centers (e.g., buildings). Although the persistent storage 106 is illustrated in FIG. 1 as being positioned external to the serverless environment 104, this configuration is not required and the serverless environment 104 may host the persistent storage 106.

The first serverless database is exemplified as a data repository hosted in the persistent storage 106 and configured to store a plurality of executable files. Each executable file may represent a statistical model implemented as a script, binary, or container image. The executable files may be organized by model type, version, or configuration profile. The first serverless database may be implemented using a NoSQL engine optimized for storing unstructured or semi-structured data. The first serverless database may support high-throughput read operations to enable rapid retrieval by the execution logic. The first serverless database may be indexed by model identifiers or tags. The first serverless database may support version control and metadata tagging. The first serverless database may be idle in the dormant state, with no active queries. The first serverless database may be integrated with model registries or CI/CD pipelines. The first serverless database may support access control and audit logging. The first serverless database may be replicated across geographic regions for fault tolerance. The first serverless database may be monitored for access frequency and storage utilization. The first serverless database may support schema validation for executable metadata. The first serverless database may be updated through automated deployment workflows. The first serverless database may be queried using API endpoints or SDKs. The first serverless database may serve as the primary model repository for system 100.

The second serverless database is exemplified as a data repository hosted in the persistent storage 106 and configured to store a plurality of configuration profiles. Each configuration profile may define parameters for model selection, execution thresholds, or data filtering. The configuration profiles may be stored in structured formats, such as JSON, YAML, or CSV. The second serverless database may be implemented using a NoSQL engine optimized for low-latency key-value lookups. The second serverless database may be queried by the execution logic based on attributes extracted from the request. The second serverless database may support indexing by attribute keys or profile categories. The second serverless database may be idle in the dormant state, with no active queries. The second serverless database may support schema validation and versioning. The second serverless database may be integrated with configuration management systems. The second serverless database may support access control and encryption. The second serverless database may be monitored for query performance and data freshness. The second serverless database may be updated through administrative interfaces or automated pipelines. The second serverless database may support tagging and metadata enrichment. The second serverless database may be replicated across geographic regions for high availability. The second serverless database may be queried using RESTful APIs or SDKs. The second serverless database may serve as the configuration source for model execution.

The system 100 may leverage a plurality of configuration profiles stored in the second serverless database, each defining parameters for model selection, execution thresholds, or data filtering. The execution logic may query these profiles to tailor processing for each request. For instance, pharmacy-based profiles may specify rules for controlled substances, insurance types, or patient demographics. In another example, clinical systems may use profiles for different care pathways or treatment protocols. In another example, supply chain platforms may use profiles for product categories or vendor-specific rules. This plurality enables adaptive, context-aware operation.

The third serverless database is exemplified as a data repository hosted in the persistent storage 106 and configured to store a plurality of historical metadata entries. Each metadata entry may represent an output from a prior execution of the system 100. The metadata may include binary or non-binary indicators, context identifiers, timestamps, and request identifiers. The third serverless database may be implemented using a NoSQL engine optimized for time-series or append-only data. The execution logic is configured to write a first copy of the outputs into this database in a metadata format. The metadata may be written chunk-by-chunk, where each chunk is one megabyte or less in size. The third serverless database may support indexing by time, request ID, or context identifier. The third serverless database may be idle in dormant state, with no active writes. The third serverless database may support retention policies for data aging and archival. The third serverless database may be queried by the rule engine to derive historical trends. The third serverless database may support access control and encryption. The third serverless database may be monitored for write throughput and storage capacity. The third serverless database may be integrated with analytics or visualization tools. The third serverless database may support schema evolution and metadata tagging. The third serverless database may be replicated across geographic regions for durability and fault tolerance. The third serverless database may serve as the historical context engine.

The system 100 may maintain a plurality of historical metadata entries in the third serverless database, each representing outputs from prior executions. This metadata may include binary indicators, context identifiers, timestamps, and request attributes. For example, pharmacy systems may store historical approval/denial decisions, prescription fill dates, and patient adherence data. In another example, healthcare analytics may store patient risk scores and outcome predictions. In yet another example, financial platforms may store transaction risk levels and audit trails. This plurality supports longitudinal analysis and trend identification.

The computing terminal 108 is exemplified as a user-facing computing device configured to host an operating system and an application program running on the operating system. The computing terminal 108 may be implemented as a desktop computer, a laptop computer, a tablet computer, a phone, a wearable computer, or an embedded machine. The computing terminal 108 may be located within a pharmacy, clinic, or enterprise facility. The application program hosted on the operating system is configured to generate a request in the first data format. The application program may include a graphical user interface (GUI) or an automated agent. The application program may collect input from a user or an external system. The application program may transmit the request to the parsing logic via the network 102. The computing terminal 108 may be connected to the network 102 using wired or wireless communication. The computing terminal 108 may be idle in dormant state, with no active user interaction. The computing terminal 108 may be secured using authentication and access control mechanisms. The computing terminal 108 may be monitored for system health and connectivity. The computing terminal 108 may be configured to receive and display the binary result returned by the parsing logic, although a non-binary result is possible. The computing terminal 108 may be integrated with other enterprise systems or databases. The computing terminal 108 may support logging and audit trails. The computing terminal 108 may serve as the entry and exit point for data transactions in the system 100.

Figure 2:
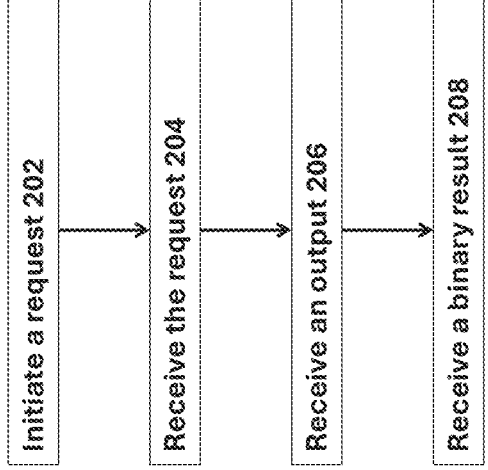
FIG. 2 shows a flowchart of an example of a method for operating the computing architecture of FIG. 1 according to this disclosure.
Figure 2:
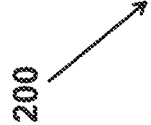

FIG. 2 shows a flowchart of an example of a method for operating the computing architecture of FIG. 1 according to this disclosure. In particular, there is a method 200 to operate the system 100 of FIG. 1. The method has a plurality of steps 202-208. As explained above, the system 100 operates within the serverless environment 104 to enable distributed execution of the parsing logic, the execution logic, and the rule engine. The serverless environment 104 hosts the plurality of compute nodes that independently execute these components without requiring real-time provisioning. Each compute node dynamically handles incoming requests by executing assigned logic modules in parallel. The parsing logic receives requests from the computing terminal 108, which hosts the application program generating requests in a first data format (e.g., structured, delimited, NCPDP, JSON, CSV, XML). The execution logic, logically interposed between the parsing logic and the rule engine, processes the requests after conversion into a second data format (e.g., structured, delimited, NCPDP, JSON, CSV, XML). The rule engine applies a plurality of rules to the processed data to generate binary results, although non-binary results are possible. These binary results are returned to the parsing logic for final conversion and delivery. The system 100 is designed to ensure low-latency processing within a defined time window. The serverless environment 104 enables elastic scalability and fault tolerance across compute nodes. The system 100 is designed to eliminate the need for persistent server allocation, reducing operational overhead. The parsing logic initiates the time window upon receiving a request. The execution logic performs parallel execution of statistical models based on configuration profiles. The rule engine evaluates outputs using predefined rules stored in the persistent storage 106. The system 100 is designed to support structured and delimited data formats for interoperability. The computing terminal 108 may be deployed in a pharmacy setting.

In step 202, the parsing logic initiates request handling by receiving a request in the first data format from the application program over the network 102. The request includes a plurality of attributes that define the operational context. Upon receipt, the parsing logic converts the request into a second data format suitable for downstream processing. The converted request is transmitted to the execution logic for further handling. The parsing logic operates without requiring dedicated compute resources, leveraging the serverless environment 104. The conversion process ensures compatibility with the execution logic's data handling requirements. The parsing logic maintains format integrity during conversion to preserve attribute fidelity. The parsing logic also timestamps the request to initiate the time window. The time window defines the maximum allowable duration for processing the request. The parsing logic ensures that the request is routed to an available compute node. The compute node executes the parsing logic as a stateless function. The parsing logic may include validation routines to verify request structure. The parsing logic may also log metadata for audit purposes. The parsing logic prepares the request for efficient querying of configuration profiles. The parsing logic ensures that the request structure aligns with the schema expected by the execution logic. The parsing logic thereby enables seamless transition to the execution phase.

In step 204, the execution logic receives the converted request in the second data format over the network 102 and begins processing immediately. The execution logic queries the second serverless database to retrieve a subset of configuration profiles. The subset is selected based on matching a subset of the request's attributes. The configuration profiles define parameters for selecting statistical models. The execution logic then queries the first serverless database to retrieve a subset of executable files. These executable files correspond to the selected configuration profiles. The executable files may be script files implementing statistical models. The execution logic executes the subset of executable files in parallel across compute nodes. Each executable file generates an output based on the statistical model it implements. The outputs include binary indicators and context identifiers. The context identifiers reference historical trends stored in the third serverless database. The execution logic generates a first copy of the outputs in a metadata format. The metadata format is suitable for storage in the third serverless database. The execution logic writes the first copy into the third database data chunk-by-data chunk. Each data chunk may be one about megabyte or less in size. The execution logic also generates a second copy of the outputs in the second data format. The second copy is transmitted to the rule engine for evaluation.

The system 100 may be technologically adapted to derive and update a plurality of historical trends from the stored metadata. For example, these trends may include patterns in prescription approvals, patient adherence, or transaction anomalies. For example, pharmacy-based trends may track refill frequencies or insurance rejections over time. In another example, clinical analytics may identify trends in patient outcomes or events. In yet another example, financial systems may monitor trends in fraud attempts or transaction volumes. The plurality of trends enables the rule engine to make context-aware decisions.

Note that the system 100 writes the first copy of the plurality of outputs in a metadata format into the third serverless database data chunk-by-data chunk, where each chunk may be about one megabyte or less in size, to optimize distributed write performance and reduce latency in serverless environments. This chunk size constraint addresses a technical problem in cloud-native storage systems, where large write operations can exceed memory limits or trigger throttling in serverless functions. By constraining each chunk to about one megabyte or less, the system 100 ensures compatibility with ephemeral memory allocations typical of serverless compute nodes. This constraint also enables parallelized, non-blocking writes across multiple nodes, thereby improving throughput and fault isolation. The chunking mechanism allows the system to resume interrupted writes without reprocessing entire datasets, which enhances reliability. The one-megabyte threshold aligns with performance tuning parameters of common NoSQL databases, reducing garbage collection overhead. The chunk size also facilitates efficient indexing and retrieval of historical metadata. The system 100 thereby achieves a balance between write granularity and storage efficiency. The chunking strategy supports real-time ingestion of metadata without degrading system responsiveness. Therefore, this configuration enables maintaining stateless, scalable operation to allow for distributed metadata persistence.

In some examples, the execution logic is configured to write the first copy of the outputs in the metadata format into the third serverless database data chunk-by-data chunk, where each chunk is determined based on a predefined size of a data chunk. For example, the execution logic may segment the metadata into discrete chunks, each of which is about one megabyte or less in size, and sequentially write each chunk into the third serverless database. In a pharmacy-based use case, metadata representing prescription transaction outcomes may be written chunk-by-chunk to optimize storage performance and ensure compliance with memory constraints of serverless compute nodes. In another example, the execution logic may dynamically adjust the chunk size based on system load or database throughput, thereby maintaining efficient write operations under varying conditions. In yet another example, the chunk-by-chunk writing mechanism may enable partial commits and recovery from transient failures, as each chunk is independently persisted based on its size. This chunking strategy ensures reliable, scalable, and stateless persistence of metadata outputs, supporting real-time ingestion and historical trend analysis in distributed environments.

Data chunking can be of various types. For example, there may be variable-size chunking where data chunks vary in size based on data properties. Also, there may be content-based chunking where data is chunked according to specific content patterns or logical boundaries. Further, there may be logical chunking where chunks are created according to logical units or keys rather than size. Additionally, there may be dynamic chunking where chunk sizes are adjusted dynamically based on system constraints like memory or workload. Moreover, there may be task-based chunking where data is divided optimally for parallel processing. Furthermore, there may be file-based chunking where large files are split into smaller pieces for easier transfer and storage, such as video streaming segments.

In some examples, since the system 100 comprises the serverless environment 100 in which the execution logic writes metadata outputs into the third serverless database within the persistent storage 106, in context of variable-size chunking, the execution logic may be technologically adapted to analyze the properties of the output data—such as entropy, record length, or statistical variance—and segment the metadata into chunks of varying sizes. This adaptation may involve dynamic algorithms that determine chunk boundaries based on the nature of the data, rather than fixed thresholds. For example, in a pharmacy-based application, transaction records with similar attributes (e.g., refill requests for the same medication) may be grouped into larger chunks, while records with high variability (e.g., new prescriptions with complex insurance adjudication) are stored in smaller chunks to facilitate rapid access and error isolation. In another example, a healthcare analytics platform may use variable-size chunking to store patient monitoring data, grouping stable readings into larger chunks and abnormal readings into smaller, more granular chunks for detailed analysis. In yet another example, a financial transaction system may segment transaction logs into variable-sized chunks based on transaction frequency, with high-frequency periods resulting in smaller, more frequent chunks to optimize fraud detection and audit trails. The system's chunking mechanism is thus enhanced to support variable-size segmentation, requiring the execution logic to implement data-driven chunk boundary detection and the third database to accept non-uniform chunk sizes.

In some examples, since the system 100 comprises the serverless environment 100 in which the execution logic writes metadata outputs into the third serverless database within the persistent storage 106, in context of content-based chunking, the execution logic may be technologically adapted, where data is segmented according to specific content patterns or logical boundaries. This adaptation may involve parsing the output data for semantic markers, delimiters, or record boundaries, and creating chunks that align with these features. For instance, in a pharmacy-based scenario, each chunk may correspond to a complete prescription record or transaction, ensuring that related data is stored together for regulatory compliance and efficient retrieval. In another example, an electronic health record (EHR) system may chunk patient data at the boundary of each clinical encounter, so that all notes, lab results, and prescriptions from a single visit are stored in one chunk. In yet another example, a document management system may segment legal contracts into chunks based on section headings or clause boundaries, enabling targeted search and version control. The execution logic may be enhanced with pattern recognition algorithms to identify appropriate chunk boundaries, and the third serverless database may be configured to store chunks defined by content rather than size. This approach improves semantic integrity and facilitates efficient querying by ensuring that each chunk contains logically related data.

In some examples, since the system 100 comprises the serverless environment 100 in which the execution logic writes metadata outputs into the third serverless database within the persistent storage 106, in context of logical chunking, the system 100 may be technologically adapted for logical chunking, where chunks are created according to logical units or keys, such as patient ID, prescription ID, or transaction type, rather than physical size. The execution logic is configured to group metadata outputs based on these logical identifiers, so that all data associated with a particular key may be stored within a single chunk. For example, in a pharmacy-based use case, all prescription records for a given patient may be grouped together, enabling longitudinal analysis and rapid retrieval for medication therapy management. In another example, a supply chain management system may chunk inventory data by product SKU, so that all transactions, shipments, and restock events for a specific product are stored together. In yet another example, a cloud-based CRM platform may group customer interaction logs by account ID, allowing for efficient access to all communications and transactions related to a single customer. This adaptation requires the execution logic to implement key-based grouping algorithms and the third serverless database to support retrieval by logical unit. Logical chunking enhances targeted access and indexing, enabling efficient retrieval of contextually related data.

In some examples, since the system 100 comprises the serverless environment 100 in which the execution logic writes metadata outputs into the third serverless database within the persistent storage 106, in context of dynamic chunking, the execution logic may be technologically adapted for dynamic chunking, where chunk sizes may be adjusted in real-time based on constraints of the system 100, such as available memory, current workload, or database throughput. This adaptation involves monitoring system 100 resources and dynamically modifying chunk boundaries to optimize performance. For example, in a pharmacy-based scenario, chunk sizes may be reduced during peak transaction periods to prevent memory contention, while larger chunks may be used during off-peak times for efficient batch processing of historical data. In another example, a streaming analytics platform may dynamically adjust chunk sizes based on incoming data velocity, shrinking chunks during spikes in event volume to maintain low latency. In yet another example, an Internet-Of-Things (IoT) sensor network may increase chunk sizes when network bandwidth is high and decrease them during congestion, ensuring reliable data ingestion and storage. The execution logic may incorporate resource-aware algorithms, and the third serverless database may be configured to accept chunks of varying sizes as determined by current system conditions. Dynamic chunking enables the system to maintain optimal performance and reliability under fluctuating workloads.

In some examples, since the system 100 comprises the serverless environment 100 in which the execution logic writes metadata outputs into the third serverless database within the persistent storage 106, in context of task-based chunking, the system 100 may be technologically adapted for task-based chunking, where data may be divided into chunks optimized for parallel processing tasks. The execution logic may analyze the computational workload and segments metadata outputs into chunks that can be processed independently and concurrently by multiple compute nodes. For example, in pharmacy-based analytics, prescription records may be chunked to align with batch processing for insurance adjudication, allowing multiple claims to be evaluated in parallel for faster turnaround. In another example, a genomics research platform may divide DNA sequence data into chunks optimized for distributed analysis, enabling simultaneous computation of genetic variants across multiple servers. In another example, a financial risk modeling system may segment market data into chunks corresponding to different asset classes, allowing risk calculations to be performed in parallel for equities, bonds, and derivatives. This adaptation may require the execution logic to implement workload-aware chunking algorithms and the third serverless database to support concurrent access and processing of chunks. Task-based chunking maximizes throughput and minimizes latency by enabling efficient parallelization across the serverless environment.

In some examples, since the system 100 comprises the serverless environment 100 in which the execution logic writes metadata outputs into the third serverless database within the persistent storage 106, in context of file-based chunking, the system 100 may be technologically adapted for file-based chunking, where large files—such as video streams, audit logs, or bulk transaction datasets—are split into smaller segments for easier transfer and storage. The execution logic may divide these large files into manageable chunks, each representing a segment of the original file, and writes them sequentially into the third serverless database. For example, in a pharmacy-based scenario, large audit logs may be chunked into daily or hourly segments for efficient archival and retrieval, supporting regulatory audits and compliance reporting. In another example, a telemedicine platform may chunk recorded video consultations into time-based segments for secure storage and streaming, enabling on-demand playback and bandwidth optimization. In yet another example, a cloud backup service may split large database dumps into file-based chunks for incremental upload and disaster recovery, ensuring data integrity and minimizing transfer failures. This adaptation may require the execution logic to implement file segmentation algorithms and the third serverless database to support ordered storage and retrieval of file segments. File-based chunking enables the system to efficiently manage large data objects in distributed storage environments.

Note that the execution logic receives the request in the second data format, queries the second serverless database to retrieve a subset of configuration profiles based on selecting a subset of request attributes, queries the first serverless database to retrieve a subset of executable files based on the configuration profiles, executes the executable files in parallel to generate outputs containing binary or non-binary indicators and context identifiers, generates a first copy of outputs in a metadata format for storage, and generates a second copy in the second data format for rule evaluation. This sequence of operations solves multiple technical problems in distributed computing, including dynamic model selection, parallel execution, and real-time metadata generation. The attribute-based querying of configuration profiles enables context-aware model selection without hardcoded logic, improving adaptability. The parallel execution of statistical models across compute nodes maximizes throughput and minimizes latency. The generation of binary or non-binary indicators and context identifiers enables downstream rule engines to make decisions based on both real-time and historical data. The dual-copy mechanism ensures that metadata is persistently stored while actionable results are immediately available for evaluation. The chunked write of metadata into the third serverless database supports scalable, fault-tolerant persistence. This configuration defines a concrete, technical workflow that transforms input data into structured outputs using specific computing resources and logic. The operations are implemented through a series of interdependent, stateless functions that solve real-world computing challenges in cloud-native environments.

Note that the system 100 writes the first copy of the plurality of outputs in a metadata format into the third serverless database data chunk-by-data chunk to address technical limitations in distributed, stateless storage systems. This chunked writing strategy solves a concrete problem in serverless environments, where large, monolithic write operations can exceed memory or execution time limits of ephemeral compute nodes. By writing data chunk-by-data chunk, the system 100 ensures that each write operation remains within the resource constraints of the serverless function executing the logic. This approach also enables partial progress to be committed without requiring full transaction rollback in the event of failure, thereby improving fault tolerance. The chunking mechanism supports parallel writes from multiple compute nodes, increasing throughput and reducing contention. The system 100 may use chunk identifiers and offsets to ensure ordered and complete reconstruction of metadata. The chunked writing strategy also facilitates incremental updates to historical metadata without reprocessing entire datasets. The system 100 may implement retry logic at the chunk level to isolate and recover from transient failures. The chunk size constraint (e.g., about one megabyte or less) may align with performance characteristics of NoSQL databases. The chunk-by-chunk approach ensures reliable, scalable, and stateless persistence of analytical outputs.

Note that the system 100 generates a first copy of the plurality of outputs in a metadata format to enable persistent, structured storage of analytical results for future reference and trend analysis. This metadata format solves a technical problem in distributed systems where raw outputs from statistical models are transient and not inherently queryable. By transforming outputs into metadata, the system 100 enables efficient indexing, retrieval, and correlation of historical results. The metadata may include binary or non-binary indicators and context identifiers that reference historical trends, allowing the rule engine to make context-aware decisions. The metadata format may be structured or delimited to support schema validation and compatibility with NoSQL storage. The metadata may be written into the third serverless database to maintain a persistent record of request outcomes. This persistent metadata enables longitudinal analysis, anomaly detection, and adaptive rule evaluation. The metadata format supports compression and encryption for secure and efficient storage. The system 100 may use metadata to generate audit logs and compliance reports. The metadata enables traceability of model execution and rule application across time. The metadata format ensures semantic consistency across distributed compute nodes. The use of metadata is a technical mechanism for bridging real-time analytics with historical context. The system thereby solves a concrete computing problem in preserving and operationalizing analytical outputs.

The system 100 may be technologically enabled to generate and utilize a metadata format for storing outputs in the third serverless database. This format may be structured (e.g., JSON, CSV) or delimited, supporting efficient indexing, retrieval, and analysis. For example, pharmacy-based metadata may include prescription status, timestamps, and patient identifiers. In another example, clinical analytics may use metadata for risk scores and encounter details. In yet another example, financial systems may use metadata for transaction details and audit trails. The metadata format ensures interoperability and traceability.

In step 206, the rule engine receives the second copy of the outputs in the second data format over the network 102 and applies applicable rules. The rule engine accesses a plurality of rules stored in the persistent storage 106. Each rule defines a condition-action pair for evaluating outputs. The rule engine selects at least one rule based on the context identifiers in the outputs. The rule engine evaluates the outputs against the selected rule to generate a binary result (e.g., I/O, true/false, approve/deny, yes/no, positive/negative), although a non-binary result is possible. The binary result indicates approval or denial of the request. The rule engine formats the binary result in the second data format. The rule engine transmits the binary result to the parsing logic for final processing. The rule engine operates as a stateless function within the serverless environment 104. The rule engine may apply multiple rules in sequence or in parallel. The rule engine ensures deterministic evaluation of outputs. The rule engine may log rule application metadata for traceability. The rule engine supports rule versioning to accommodate updates. The rule engine may include a rule prioritization mechanism. The rule engine ensures that rule evaluation completes within the time window. The rule engine thereby enables policy enforcement based on historical and real-time data.

The system 100 may be configured to update the plurality of historical trends in real time as new metadata outputs are written to the third serverless database. This updating process may ensure that trend analysis reflects the most recent data, supporting adaptive rule evaluation. For example, pharmacy systems may update trends in prescription adherence or insurance rejections with each new transaction. In another example, clinical analytics may update trends in patient outcomes or events. In yet another example, financial platforms may update fraud detection trends with each processed transaction. This continuous updating enables the system to maintain accurate, actionable insights.

In some examples, the rule engine is configured to apply at least one rule that conditions or requires evaluation of at least one metadata element sourced from the second copy of the outputs, where the second copy is formatted in the metadata format. For instance, the rule engine may select a rule that references a specific metadata element-such as a context identifier, timestamp, or binary indicator-contained within the second copy in the metadata format. The rule engine may parse the second copy to extract the required metadata element and apply the rule logic based on the value or presence of that element. For example, in a pharmacy-based use case, the rule engine may require a metadata element indicating prior approval status or prescription fill history, sourced from the second copy in the metadata format, to determine whether to approve a new request. In another example, the rule engine may condition a rule on a metadata element representing a threshold value extracted from the second copy. In yet another example, the rule engine may require a metadata element indicating compliance with regulatory standards, sourced from the second copy, to enforce workflow rules. This configuration enables the rule engine to leverage structured metadata elements in the second copy for context-aware and adaptive rule evaluation, thereby enhancing decision accuracy and traceability.

In some examples, the system 100 may be technologically adapted to support rule engine outputs that are non-binary, such as multi-valued, categorical, probabilistic, or continuous results. The rule engine may apply rules that generate results beyond simple approval or denial, including graded recommendations, risk scores, or categorical classifications. For instance, in a pharmacy-based scenario, the rule engine may output a recommendation (e.g., increase, decrease, or maintain a regimen or a workflow) based on patient history and medication interactions, rather than a binary approve/deny. In another example, a healthcare analytics platform may use the rule engine to produce a risk score for events, outputting a continuous value between 0 and 1 to indicate likelihood. In yet another example, a financial transaction system may classify transactions into multiple categories (e.g., low, medium, high risk) for compliance review, rather than a binary flag. To enable such use cases, the execution logic and parsing logic may be configured to handle and transmit non-binary results in both the second and first data formats, and the persistent storage may be adapted to store multi-valued or continuous metadata. This configuration allows the system to support advanced decision-making workflows and nuanced rule evaluation beyond binary outcomes.

In step 208, the parsing logic receives the binary result from the rule engine over the network 102 and prepares the binary result for delivery to the application program. The binary result is converted from the second data format to the first data format. The conversion ensures compatibility with the application program's expected input format. The parsing logic appends the binary result to the original request attributes. The parsing logic transmits the final result to the computing terminal 108. The transmission marks the termination of the time window. The parsing logic may log the final result for audit purposes. The parsing logic ensures that the result is delivered within the defined time window. The parsing logic may include error handling routines for failed conversions. The parsing logic may also include retry mechanisms for transient failures. The parsing logic ensures that the binary result maintains semantic integrity during conversion. The parsing logic may include encryption routines for secure transmission. The parsing logic may also include compression routines for efficient delivery. The parsing logic thereby completes the request lifecycle. The parsing logic ensures that the system operates in a stateless, serverless manner. The parsing logic enables real-time decision-making in distributed environments.

As explained above, the persistent storage 106 supports the distributed architecture of the system 100 by hosting three distinct serverless databases. The first serverless database stores a plurality of executable files that enable statistical models. These executable files may be implemented as script files optimized for parallel execution. The second serverless database stores a plurality of configuration profiles used to parameterize model execution. These configuration profiles may be stored in structured or delimited data formats. The third serverless database stores a plurality of historical metadata representing historical trends. The historical metadata is updated dynamically as new requests are processed. The third serverless database supports data chunking, with each chunk being about one megabyte or less. The persistent storage 106 enables high-throughput access to configuration, model, and trend data. The serverless databases may be implemented using NoSQL technologies for scalability. The persistent storage 106 supports concurrent read and write operations across compute nodes. The storage architecture ensures data consistency without centralized coordination. The persistent storage 106 enables rapid retrieval of configuration profiles based on request attributes. The storage system supports indexing for efficient query execution. The persistent storage 106 ensures that historical metadata is continuously updated. The persistent storage 106 thereby supports real-time analytics and decision-making.

The computing terminal 108 serves as the user-facing interface for generating and submitting requests. The computing terminal 108 hosts the application program that formats requests in the first data format. For example, the first data format may conform to the NCPDP standard for pharmacy-based transactions when the application program is deployed in a pharmacy to support prescription processing. The computing terminal 108 transmits requests to the parsing logic over the network 102. The application program may include a user interface for entering request attributes. The computing terminal 108 may timestamp requests to support auditability. The application program may validate request structure before transmission. The computing terminal 108 may receive binary results indicating approval or denial of requests. The computing terminal 108 may log results for compliance and reporting. The application program may support batch submission of multiple requests. The computing terminal 108 may include local caching for offline operation. The application program may support integration with pharmacy management systems. The computing terminal 108 may be configured to operate within regulatory constraints. The computing terminal 108 thereby enables real-time interaction with the serverless system 104. The computing terminal 108 supports seamless integration into pharmacy workflows if needed, although other use cases are possible.

The system 100 is designed to enable the execution logic to operate without real-time provisioning of compute resources. The execution logic is deployed as a stateless function across the plurality of compute nodes. Each compute node may execute assigned executable files in parallel to maximize throughput. The execution logic selects executable files based on configuration profiles retrieved from the second serverless database. The configuration profiles are selected based on matching request attributes. The execution logic ensures that statistical models are executed with appropriate parameters. The execution logic generates outputs containing binary indicators and context identifiers. The context identifiers reference historical trends stored in the third serverless database. The execution logic generates a first copy of outputs in a metadata format for storage. The execution logic writes the metadata copy into the third database data chunk-by-data chunk. The execution logic generates a second copy of outputs in the second data format for rule evaluation. The execution logic ensures that both copies are generated within the time window. The execution logic may include error handling for failed model executions. The execution logic may include retry mechanisms for transient failures. The execution logic ensures that outputs are semantically consistent across parallel executions. The execution logic thereby enables scalable, stateless processing of complex analytical workloads.

As described above, the system 100 supports dynamic rule evaluation through the rule engine operating in the serverless environment 104. The rule engine receives outputs in the second data format from the execution logic. The rule engine applies at least one rule from a plurality of rules stored in the persistent storage 106. Each rule defines a logical condition and corresponding action for evaluating outputs. The rule engine selects applicable rules based on context identifiers in the outputs. The rule engine evaluates outputs to generate a binary result indicating approval or denial. The rule engine formats the binary result in the second data format for transmission. The rule engine transmits the binary result to the parsing logic for final conversion. The rule engine supports concurrent evaluation of multiple rules across compute nodes. The rule engine may include a rule prioritization mechanism to resolve conflicts. The rule engine may support rule versioning to accommodate updates. The rule engine ensures deterministic evaluation of outputs within the time window. The rule engine may log rule application metadata for traceability. The rule engine may support dynamic rule loading based on request context. The rule engine ensures that rule evaluation is stateless and scalable. The rule engine thereby enables policy enforcement based on real-time and historical data.

The system 100 is designed to ensure that all processing occurs within a defined time window initiated by the parsing logic. The time window begins when the parsing logic receives a request in the first data format. The time window defines the maximum allowable duration for processing the request through all relevant components of the system 100. The parsing logic converts the request into the second data format and transmits it to the execution logic. The execution logic retrieves configuration profiles and executable files, executes statistical models, and generates outputs. The execution logic transmits outputs to the rule engine for evaluation. The rule engine applies rules and generates a binary result. The binary result is transmitted to the parsing logic for final conversion. The parsing logic converts the binary result into the first data format and transmits it to the application program. The entire process must complete within the time window, which may be five seconds or less. The time window ensures real-time responsiveness for pharmacy-based applications. The time window enables consistent performance across varying workloads. The time window supports compliance with regulatory requirements for transaction latency. The time window ensures that system components operate in a coordinated manner. The time window enables predictable system behavior under load. The time window thereby defines the operational boundary for request processing.

Note that the system 100 defines the time window, which may be about five seconds or less, to bound the total duration of request processing from receipt to result delivery. This time window solves a technical problem in distributed, stateless architectures where unbounded execution can lead to resource contention, inconsistent state, and degraded user experience. By enforcing a strict time window, the system 100 ensures that all relevant compute nodes complete parsing, execution, and rule evaluation within a predictable latency envelope. This constraint enables the system 100 to meet real-time responsiveness requirements, especially in pharmacy-based applications, where delays can impact patient care. The time window also allows the system 100 to implement timeout and retry logic deterministically, thereby improving fault tolerance. The constraint supports autoscaling policies by providing a measurable service-level objective (SLO). The time window ensures that ephemeral compute resources are released promptly, reducing cost and avoiding cold-start penalties. The system 100 uses the time window to coordinate asynchronous operations across parsing logic, execution logic, and the rule engine. The constraint may be enforced programmatically. The time window thereby addresses a concrete technical challenge in orchestrating stateless, distributed processing pipelines.

The system 100 is enabled to support historical trend analysis by continuously updating the third serverless database with metadata outputs. The execution logic generates a first copy of outputs in a metadata format suitable for storage. The metadata format may be structured or delimited to support efficient querying. The execution logic writes the metadata copy into the third database data chunk-by-data chunk. Each data chunk may be about one megabyte or less in size to optimize write performance. The third serverless database stores a plurality of historical metadata representing prior request outcomes. The historical metadata enables identification of trends across multiple requests. The context identifiers in outputs reference specific historical trends. The historical trends may span a period of about seven years or less. The third serverless database supports indexing for rapid trend retrieval. The historical metadata may be used to inform rule selection in the rule engine. The historical metadata may also support audit and compliance reporting. The third serverless database supports concurrent writes from multiple compute nodes. The metadata format ensures semantic consistency across stored outputs. The third serverless database enables longitudinal analysis of request patterns. The historical metadata thereby enhances the system's decision-making capabilities.

Note that the system 100 stores a plurality of historical trends for about seven years or less in the third serverless database to enable bounded, performant access to relevant metadata during rule evaluation. This temporal constraint addresses a technical problem in long-term data retention systems, where unbounded historical data can degrade query performance and increase storage costs. By limiting historical trend data to about seven years or less, the system 100 ensures that context identifiers used during rule evaluation reference only statistically relevant and computationally manageable datasets. This constraint enables the system to maintain low-latency access to historical metadata without requiring full-table scans or complex archival logic. This about seven-year window also aligns with regulatory and operational requirements in pharmacy-based environments, ensuring compliance without compromising performance.

The system 100 may implement rolling expiration policies to enforce this constraint automatically. The bounded historical window also reduces the memory footprint of in-memory indexes used during execution logic and rule engine operations. The constraint enables the system 100 to scale horizontally without incurring exponential growth in metadata volume.

The system 100 may be enabled for parallel execution of statistical models to generate outputs efficiently and accurately. The execution logic retrieves a subset of executable files based on configuration profiles. Each executable file corresponds to a statistical model tailored to specific request attributes. The execution logic executes the subset of executable files in parallel across compute nodes. Each execution generates an output containing binary indicators and context identifiers. The binary indicators represent model-specific decisions or classifications. The context identifiers link outputs to historical trends stored in the third serverless database. The parallel execution model maximizes throughput and minimizes latency. The execution logic ensures that all outputs are generated within the time window. The outputs are semantically aligned to support downstream rule evaluation. The outputs may be formatted in structured or delimited formats for interoperability. The execution logic may include load balancing to distribute execution across compute nodes. The execution logic may include monitoring to detect execution anomalies. The execution logic ensures that outputs are reproducible and traceable. The execution logic supports dynamic scaling based on request volume. The parallel execution model thereby enables high-performance analytical processing.

The configuration profiles stored in the second serverless database define parameters for selecting and executing statistical models. Each configuration profile includes metadata describing applicable request attributes. The execution logic queries the second serverless database to retrieve relevant configuration profiles. The query selects a subset of profiles based on matching request attributes. The configuration profiles may be stored in structured or delimited data formats. The configuration profiles define model selection criteria and execution parameters. The execution logic uses configuration profiles to identify applicable executable files. The configuration profiles ensure that statistical models are executed with appropriate context. The configuration profiles may include versioning to support updates. The configuration profiles may include priority indicators for model selection. The configuration profiles may be updated dynamically based on system feedback. The second serverless database supports concurrent access by multiple compute nodes. The configuration profiles enable consistent model execution across requests. The configuration profiles support traceability and auditability of model selection. The configuration profiles ensure alignment between request attributes and model logic. The configuration profiles thereby enable adaptive and context-aware execution.

The system 100 is enabled to support structured and delimited data formats to ensure interoperability across components and external systems. The first data format used by the application program may conform to the NCPDP standard when used for pharmacy purposes. The second data format used internally may be structured or delimited for compatibility. The parsing logic converts between the first and second data formats as needed. The execution logic processes requests in the second data format to retrieve configuration profiles. The execution logic generates outputs in both metadata and second data formats. The rule engine evaluates outputs in the second data format to generate binary results. The parsing logic converts binary results back into the first data format for delivery. The use of structured and delimited formats ensures data integrity during conversion. The formats support schema validation and transformation operations. The formats enable efficient parsing and serialization across components. The formats support integration with external systems such as pharmacy management platforms. The formats enable consistent data representation across distributed compute nodes. The formats support logging and auditability of request processing. The formats ensure that data semantics are preserved during transformation. The formats thereby enable seamless data flow across the system.

The system 100 may be enabled for stateless operation of all logic components within the serverless environment 104. The parsing logic, execution logic, and rule engine operate as stateless functions. Each function is instantiated on demand by a compute node. The functions do not retain state between invocations, ensuring scalability. The stateless design enables elastic scaling based on request volume. The stateless functions interact with the persistent storage 106 to retrieve and store data. The stateless design reduces memory footprint and simplifies fault recovery. The stateless functions may be deployed using containerized runtimes. The stateless functions support versioning and rollback for updates. The stateless design enables rapid deployment of new logic components. The stateless functions may include logging for observability and debugging. The stateless design supports multi-tenant operation across different pharmacy locations. The stateless functions may be monitored using distributed tracing tools. The stateless design ensures consistent behavior across compute nodes. The stateless architecture supports high availability and fault tolerance. The stateless design thereby enables robust and scalable operation of the system 100.

The system 100 is enabled to support secure and efficient communication between the computing terminal 108 and the serverless environment 104. The application program transmits requests in the first data format over the network 102. The parsing logic receives the request and initiates processing within the time window. The binary result is returned to the computing terminal 108 using the same secure channel. The system 100 may employ encryption protocols to protect data in transit. The system 100 may also use authentication mechanisms to verify request origin. The communication protocol may ensure low-latency transmission of requests and results. The system 100 may support transport layer security (TLS) for encrypted communication. The system 100 may log communication events for audit and compliance. The system 100 ensures that data integrity is preserved during transmission. The system 100 may include retry logic for handling transient network failures. The system 100 may support message queuing for asynchronous communication. The system 100 may include rate limiting to prevent abuse. The system 100 may ensure that communication complies with healthcare data regulations (e.g., Health Insurance Portability and Accountability Act (HIPAA)). The system 100 may be enabled to support secure integration with external pharmacy systems. The communication architecture thereby ensures reliable and compliant data exchange.

The system 100 may enable real-time decision-making by integrating historical trends into the rule evaluation process. The execution logic generates context identifiers that reference historical metadata. The rule engine uses these identifiers to select applicable rules. The historical metadata provides context for evaluating current request outputs. The rule engine may apply rules that incorporate historical thresholds or patterns. The rule engine may adjust rule parameters based on historical trends. The historical metadata enables adaptive rule evaluation based on prior outcomes. The rule engine ensures that decisions reflect both real-time and historical data. The historical metadata may include timestamps, request attributes, and binary results. The rule engine may use this metadata to detect anomalies or patterns. The rule engine may support machine learning-based rule adaptation. The historical metadata enhances the accuracy and relevance of rule outcomes. The rule engine ensures that historical context is consistently applied. The historical metadata may be visualized for monitoring and analysis. The integration of historical trends enables data-driven decision-making. The system 100 thereby supports intelligent and context-aware rule evaluation.

The system 100 may be enabled to support modular deployment of logic components to enable flexible and maintainable architecture. The parsing logic, execution logic, and rule engine may be deployed independently. Each component may be updated or scaled without affecting others. The modular design supports separation of concerns and code reuse. The components may be deployed using container orchestration platforms. The modular architecture supports continuous integration and deployment workflows. The components may be versioned independently for controlled rollouts. The modular design enables targeted performance tuning of individual components. The components may expose APIs for inter-component communication. The modular architecture supports testing and validation of isolated components. The components may be monitored independently for health and performance. The modular design supports fault isolation and recovery. The components may be deployed across different geographic regions. The modular architecture supports hybrid cloud deployment scenarios. The components may be integrated with third-party services. The modular design thereby enhances system flexibility and maintainability.

The system 100 may be enabled to support auditability and traceability across all stages of request processing. The parsing logic may log request receipt, format conversion, and result delivery. The execution logic may log configuration profile selection, model execution, and output generation. The rule engine may log rule selection, evaluation, and binary result generation. The system may assign unique identifiers to each request for tracking. The logs may include timestamps, component identifiers, and processing durations. The logs may be stored in a centralized logging system for analysis. The system may support log aggregation and visualization tools. The logs may be used for compliance reporting and debugging. The system may support access control for log data. The logs may be encrypted to protect sensitive information. The system 100 may support retention policies for log data. The logs may be correlated across components using request identifiers. The system 100 may support alerting based on log patterns. The auditability features ensure transparency and accountability. The system 100 thereby supports regulatory compliance and operational oversight.

As described above, the system 100 provides a scalable, stateless, and serverless architecture for real-time request processing. The system 100 integrates parsing logic, execution logic, and the rule engine across distributed compute nodes. The system 100 leverages the persistent storage 106 to manage configuration profiles, executable files, and historical metadata. The system 100 supports structured and delimited data formats for interoperability. The system 100 enables parallel execution of statistical models for high-throughput processing. The system 100 incorporates historical trends into rule evaluation for context-aware decisions. The system 100 supports modular deployment and independent scaling of components. The system 100 ensures secure communication and data integrity across all interactions. The system 100 supports auditability and traceability for compliance and monitoring. The system 100 operates within a defined time window to ensure responsiveness. The system 100 supports pharmacy-based use cases through NCPDP-compliant data formats. The system 100 enables adaptive rule evaluation based on historical metadata. The system 100 supports stateless operation for fault tolerance and scalability. The system 100 enables real-time decision-making in distributed environments. The system 100 thereby addresses technical challenges in rule execution, metadata management, and performance optimization.

Figure 3:
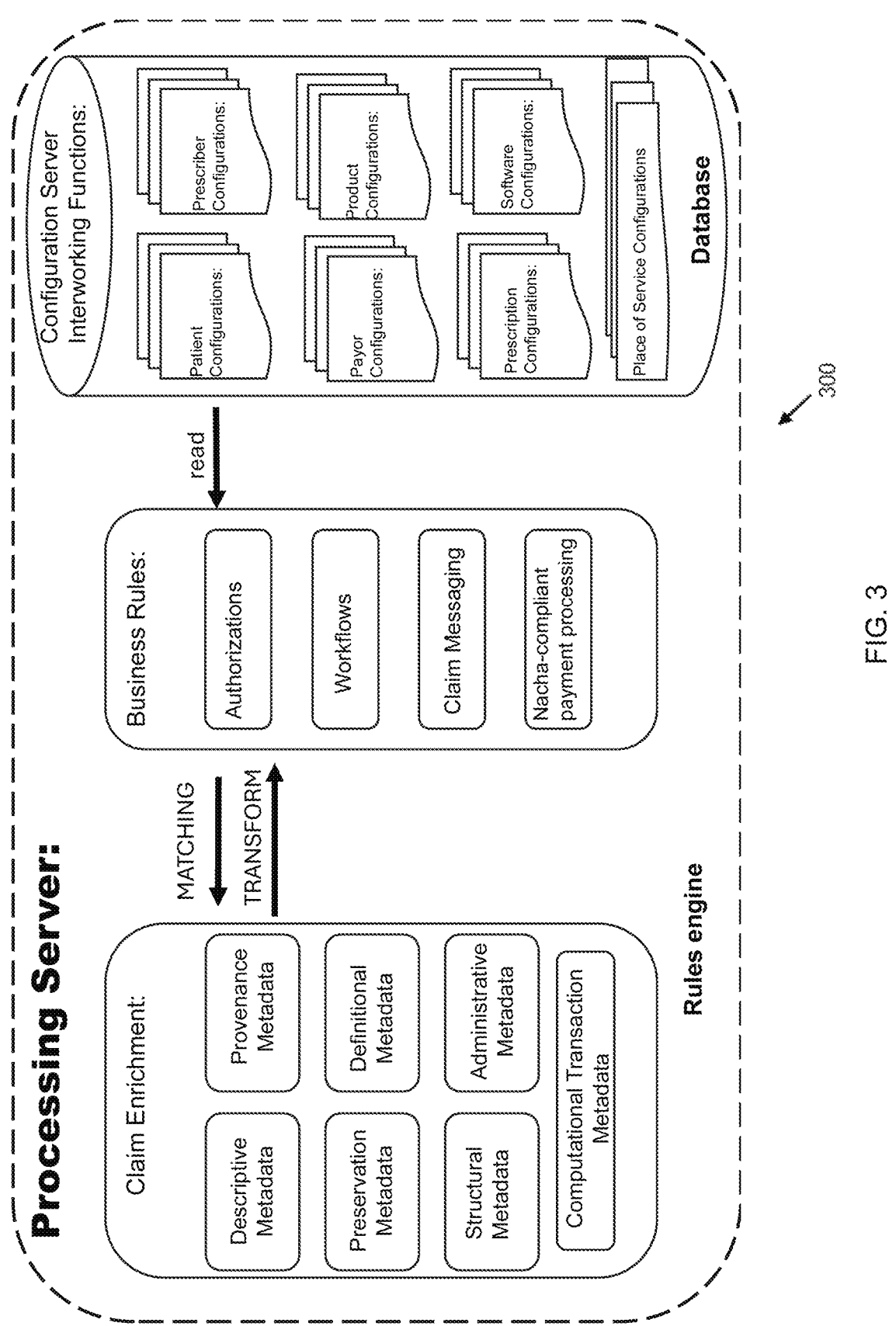
FIG. 3 shows a diagram of an example of a rule engine and an example of a database each configured for use in the computing architecture of FIG. 1.

FIG. 3 shows a diagram of an example of a rule engine and an example of a database each configured for use in the computing architecture of FIG. 1. In particular, there is a diagram 300 schematically illustrating a rule engine and a database each usable by the system 100. As shown in FIG. 3, there is a server (e.g., physical or virtual) hosting the rule engine and the database. However, note that such configuration is not required and there may be one server (e.g., physical or virtual) hosting the rule engine and another server (e.g., physical or virtual) hosting the database, where the rule engine is enabled to interface with the database, as disclosed herein.

As explained above, the rule engine may be embodied as the rule engine described above and store various metadata (e.g., descriptive, preservation, structural, provenance, definitional, administrative, computational transaction) and various business rules (e.g., authorization rules, workflow rules, messaging rules, standard compliance rules), which enable the rule engine to enrich of messages received from a routing application program when logically positioned between the application program of the computing terminal 108 and the parsing logic. For example, the rule engine may receive a message (e.g., a communication) from a routing application program, as disclosed herein, and enrich the message with at least some metadata (e.g., descriptive, preservation, structural, provenance, definitional, administrative, computational transaction) to transform (e.g., augment, supplement) the message. Then, the rule engine may apply at least some business rules to the message, as transformed, where such application may involve querying the database, as needed.

As explained above, the database may have a schema (e.g., flat, hierarchical, network, relational, star, snowflake) according to which the database stores its records. For example, in context of medical claim processing, the database may have a set of tables (e.g., related to each other by a primary key) storing data (e.g., textual, structured, unstructured, descriptive) for configurations of patient profiles, a set of tables (e.g., related to each other by a primary key) storing data (e.g., textual, structured, unstructured, descriptive) for configurations of payor profiles, a set of tables (e.g., related to each other) storing data (e.g., textual, structured, unstructured, descriptive) for configurations of prescription profiles, a set of tables (e.g., related to each other by a primary key) storing data (e.g., textual, structured, unstructured, descriptive) for configurations of prescriber profiles, a set of tables (e.g., related to each other by a primary key) storing data (e.g., textual, structured, unstructured, descriptive) for configurations of product profiles, a set of tables (e.g., related to each other by a primary key) storing data (e.g., textual, structured, unstructured, descriptive) for configurations of pharmacy software (e.g., input parameters, processing parameters, output parameters), and a set of tables (e.g., related to each other) storing data (e.g., textual, structured, unstructured, descriptive) for configurations of place of profiles. At least two of these sets of tables may be related to each other (e.g., via a primary key).

As explained above, the database may have the schema be a schema enabling storage and manage of various data elements involved. For example, there may be a patient information schema involving a patient table (e.g., patient_id, name, date_of_birth, gender, address), an insurance table (e.g., insurance_id, policy_number, group_number), and a patient_insurance table (e.g., patient_id, insurance_id) to link patients to their insurance policies. For example, there may be a provider information schema involving a provider table (e.g., provider_id, name, NPI, specialty, taxonomy_code, address). For example, there may be a service details schema involving a claim table (e.g., claim_id, patient_id, provider_id, service_date, total_charges), a diagnosis table (e.g., diagnosis_id, diagnosis_code, description), a claim_diagnosis table (e.g., claim_id, diagnosis_id) to link claims to diagnoses, a procedure table (e.g., procedure_id, procedure_code, description), and a claim_procedure table (e.g., claim_id, procedure_id, charges, modifiers) to link claims to procedures. For example, there may be a billing information schema involving a payment table (e.g., payment_id, claim_id, amount_paid, date_paid), an adjustment table (e.g., adjustment_id, claim_id, adjustment_code, amount) for claim adjustments. Resultantly, such schemas enable at least partial capture of relevant metadata required for medical claim processing, such as patient demographics, insurance details, provider information, diagnosis and procedure codes, service dates, charges, payments, and adjustments. Normalization principles may be applied to avoid data redundancy and maintain data integrity.

FIG. 4 shows a diagram of an example of a content formatted in a first data format and a second data format according to this disclosure. In particular, there is a content 400 exemplified as a the request mentioned above. On left, the request is presented in the first data format (e.g., NCPDP). On right, the request is presented in the second data format (e.g., JSON). Note that the first data format or the second data format may each be exemplified as a structured format, a delimited format, a hierarchical format, a tree format, a graph format, a CSV format, a JSON format, an XML format, a matrix format, a graph format, or another suitable format.

Various examples of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network, a neutrino network, an optical network (e.g., Li-Fi, fiberoptics), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of this disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example examples may be combined and sub-combined in and/or with various other example examples. Also, different aspects and/or elements of example examples, as disclosed herein, may be combined and sub-combined in a similar manner as well. Further, some example examples, whether individually and/or collectively, may be components of a larger system, wherein other procedures may take precedence over and/or otherwise modify their application. Additionally, a number of steps may be required before, after, and/or concurrently with example examples, as disclosed herein. Note that any and/or all methods and/or processes, at least as disclosed herein, can be at least partially performed via at least one entity or actor in any manner.

Although preferred examples have been depicted and described in detail herein, skilled persons know that various modifications, additions, substitutions and the like can be made without departing from spirit of this disclosure. As such, these are considered to be within the scope of the disclosure, as defined in the following claims.

What is claimed is:

1. A system, comprising:
a serverless environment hosting a plurality of compute nodes distributively running a parsing logic, an execution logic, and a rule engine, wherein the rule engine accesses a plurality of rules;
a persistent storage containing a first serverless database, a second serverless database, and a third serverless database, wherein the first serverless database stores a plurality of executable files enabling a plurality of statistical models, wherein the second serverless database stores a plurality of configurations profiles, wherein the third serverless database stores a plurality of historical metadata enabling a plurality of historical trends; and
a computing terminal hosting an application program such that the application program generates a request in a first data format and sends the request in the first data format to the parsing logic, wherein the request has a plurality of attributes, wherein without real-time provisioning the plurality of compute nodes to handle the request during a time window:
   a) the parsing logic receives the request in the first data format thereby initiating the time window, converts the request into a second data format, and sends the request in the second data format to the execution logic,
   b) the execution logic receives the request in the second data format, queries the second serverless database to retrieve a subset of the plurality of configuration profiles based on selecting a subset of the plurality of attributes, queries the first serverless database to retrieve a subset of the plurality of executable files based on the subset of the plurality of configuration profiles, executes the subset of the plurality of executable files in parallel to respectively generate in parallel a plurality of outputs based on selecting a subset of the plurality of statistical models such that the plurality of outputs contains a plurality of indicators and a plurality of context identifiers identifying a subset of the plurality of historical trends associated with a plurality of requests submitted to the execution logic before the request, generate a first copy of the plurality of outputs in a metadata format, write the first copy in the metadata format into the third database data chunk-by-data chunk such that the first copy in the metadata format is stored in the plurality of historical metadata thereby updating the plurality of historical trends, generate a second copy of the plurality of outputs in the second data format, send the second copy in the second data format to the rule engine,
   c) the rule engine receives the second copy in the second data format, applies at least one rule of the plurality of rules to the second copy such that a result is generated in the second data format and sent to the parsing logic, and
   d) parsing logic receives the result in the second data format, converts the result from the second data format to the first data format and sends the result in the first data format to the application program thereby terminating the time window.

2. The system of claim 1, wherein the execution logic is logically interposed between the parsing logic and the rule engine.

3. The system of claim 1, wherein the execution logic is a software engine.

4. The system of claim 1, wherein the first serverless database is a NoSQL database.

5. The system of claim 1, wherein the second serverless database is a NoSQL database.

6. The system of claim 1, wherein the third serverless database is a NoSQL database.

7. The system of claim 1, wherein at least two of the first serverless database, the second serverless database, and the third serverless database are a NoSQL database.

8. The system of claim 1, wherein the plurality of executable files is a plurality of script files.

9. The system of claim 1, wherein the plurality of configurations profiles is stored in a structured data format or a delimited data format.

10. The system of claim 1, wherein the plurality of historical metadata is stored in a structured data format or a delimited data format.

11. The system of claim 1, wherein the plurality of historical trends is for about seven years or less.

12. The system of claim 1, wherein the time window is about five seconds or less.

13. The system of claim 1, wherein the plurality of outputs is output or stored in a structured data format or a delimited data format.

14. The system of claim 1, wherein the plurality of outputs is appended to the plurality of attributes.

15. The system of claim 1, wherein the first copy is written into the third database data chunk-by-data chunk where each such data chunk is 1 megabyte or less in size.

16. The system of claim 1, wherein the computing terminal is positioned within a pharmacy.

17. The system of claim 1, wherein the first data format is a National Council for Prescription Drug Programs (NCPDP) data format.

18. The system of claim 1, wherein the second data format is a structured data format or a delimited data format.

19. The system of claim 1, wherein the result is binary indicates an approval or a denial of the request.

20. The system of claim 1, wherein the at least one rule conditions or requires at least one metadata element sourced from the second copy, wherein the second data format is the metadata format.

21. The system of claim 1, wherein the first copy in the metadata format is written into the third database data chunk-by-data chunk based on a size of a data chunk.

22. The system of claim 1, wherein the result is a binary result, wherein the plurality of indicators is a plurality of binary indicators.

23. A method, comprising:

operating a system, comprising:

a serverless environment hosting a plurality of compute nodes distributively running a parsing logic, an execution logic, and a rule engine, wherein the rule engine accesses a plurality of rules;

a persistent storage containing a first serverless database, a second serverless database, and a third serverless database, wherein the first serverless database stores a plurality of executable files enabling a plurality of statistical models, wherein the second serverless database stores a plurality of configurations profiles, wherein the third serverless database stores a plurality of historical metadata enabling a plurality of historical trends; and a computing terminal hosting an application program such that the application program generates a request in a first data format and sends the request in the first data format to the parsing logic, wherein the request has a plurality of attributes, wherein without real-time provisioning the plurality of compute nodes to handle the request during a time window:

(a) the parsing logic receives the request in the first data format thereby initiating the time window, converts the request into a second data format, and sends the request in the second data format to the execution logic, (b) the execution logic receives the request in the second data format, queries the second serverless database to retrieve a subset of the plurality of configuration profiles based on selecting a subset of the plurality of attributes, queries the first serverless database to retrieve a subset of the plurality of executable files based on the subset of the plurality of configuration profiles, executes the subset of the plurality of executable files in parallel to respectively generate in parallel a plurality of outputs based on selecting a subset of the plurality of statistical models such that the plurality of outputs contains a plurality of indicators and a plurality of context identifiers identifying a subset of the plurality of historical trends associated with a plurality of requests submitted to the execution logic before the request, generate a first copy of the plurality of outputs in a metadata format, write the first copy in the metadata format into the third database data chunk-by-data chunk such that the first copy in the metadata format is stored in the plurality of historical metadata thereby updating the plurality of historical trends, generate a second copy of the plurality of outputs in the second data format, send the second copy in the second data format to the rule engine, (c) the rule engine receives the second copy in the second data format, applies at least one rule of the plurality of rules to the second copy such that a result is generated in the second data format and sent to the parsing logic, and (d) parsing logic receives the result in the second data format, converts the result from the second data format to the first data format and sends the result in the first data format to the application program thereby terminating the time window.

\* \* \* \* \*